Sept. 12, 1944.    E. F. SCHWELLER ET AL    2,358,034
OVEN CONSTRUCTION
Filed Aug. 24, 1942    4 Sheets-Sheet 3

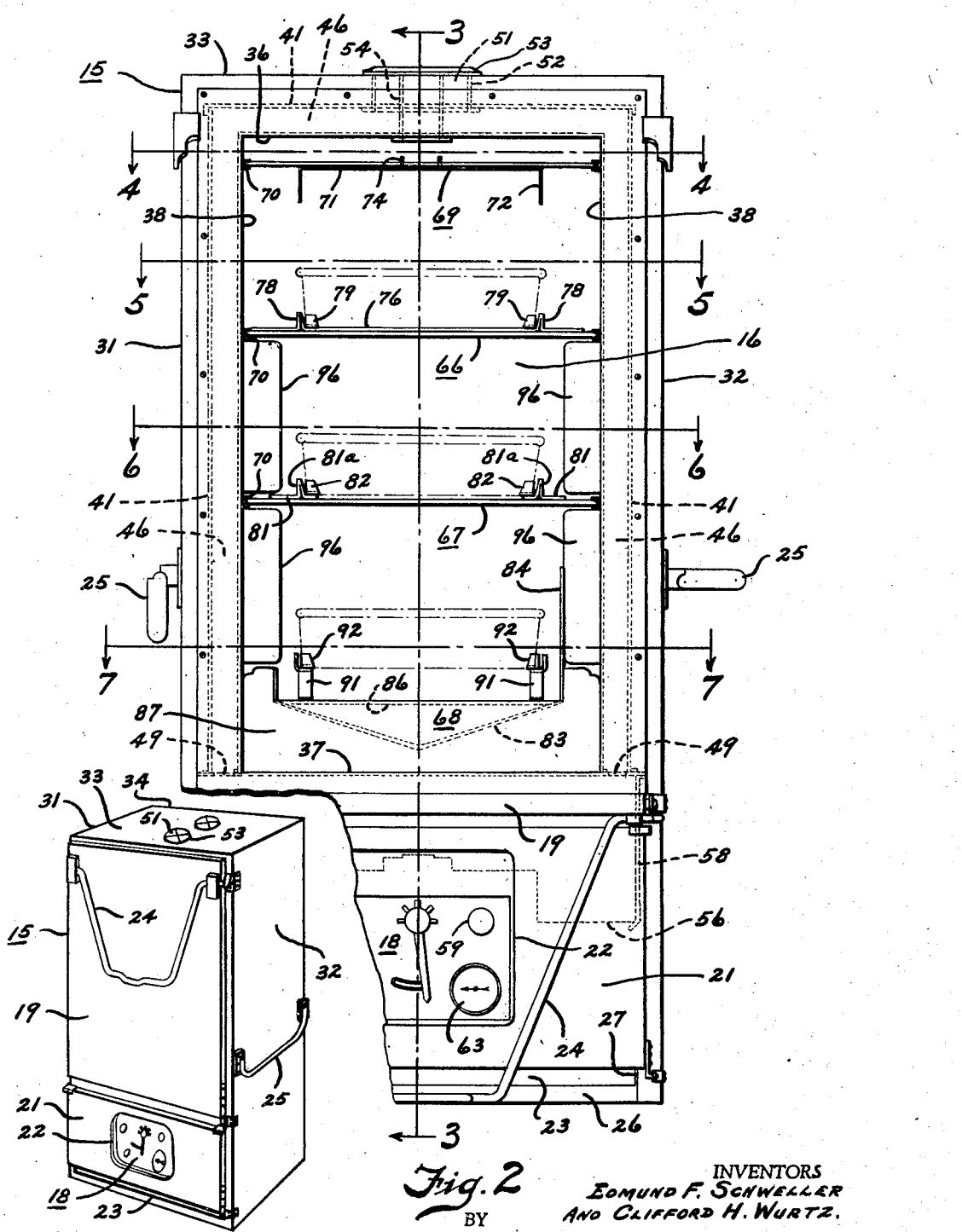

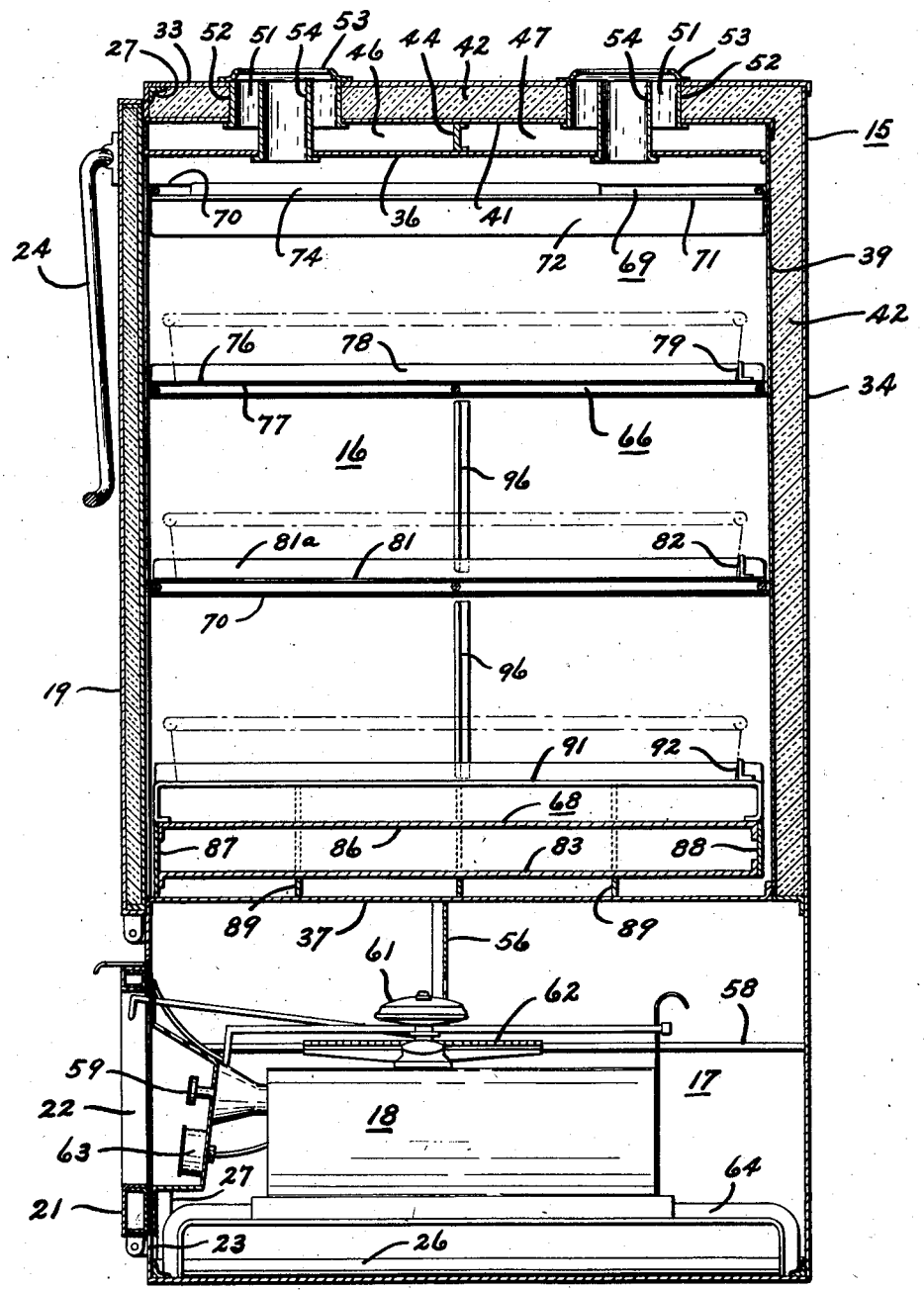

INVENTORS
EDMUND F. SCHWELLER AND
CLIFFORD H. WURTZ.
BY
Spencer, Hardman & Fehr.

INVENTORS.
EDMUND F. SCHWELLER
AND CLIFFORD H. WURTZ.
BY
Spencer, Hardman & Fehr.

Patented Sept. 12, 1944

2,358,034

UNITED STATES PATENT OFFICE 2,358,034

OVEN CONSTRUCTION

Edmund F. Schweller and Clifford H. Wurtz, Dayton, Ohio, assignors to General Motors Corporation, Dayton, Ohio, a corporation of Delaware Application August 24, 1942, Serial No. 455,892

10 Claims. (Cl. 126—19)

The present invention relates to baking ovens of the type used in the field by military forces wherein foodstuffs and particularly bread are subjected to a baking operation.

More specifically, the present invention is directed to a bread baking oven construction of the portable cabinet type wherein the interior of the cabinet is divided into a baking compartment and a heating chamber, the compartment being indirectly heated by heat radiated from walls thereof.

One of the objects of our invention is to provide a small compact oven cabinet structure of rugged construction and yet of light weight so as to be portable.

Another object of our invention is to provide a portable cabinet oven construction wherein the baking pans are arranged one above the other in a vertically elongated compartment and the heated air and gases emanating from the burner or heating apparatus are caused to flow along and in contact with substantially all the walls of the baking compartment.

A further object of our invention is the provision of an improved baffle arrangement in an oven of the type described whereby the circulation of heated air within the baking compartment is controlled to avoid large sweeps of moving air and to provide smaller directed paths of flow of the air to insure uniform baking of bread in the plurality of vertically disposed pans.

A still further object of our invention lies in the provision of an improved oven construction wherein the flame of the burner of the heating apparatus is divided by means of baffles and flues in such a manner as to insure substantially the same temperatures at the front as at the back of the oven.

In carrying out the foregoing objects, other and more specific objects reside in novel combinations and arrangements of baffles within the oven cooperating with baffles provided on or associated with the shelves and/or bread baking pans and baffles arranged to divide the oven flues as will more fully appear in the course of the following description.

In the drawings:

Fig. 1 is a perspective view of a portable oven constructed in accordance with the present invention;

Fig. 2 is an enlarged front view of the oven with the door of the baking compartment shown in open position;

Fig. 3 is a vertical sectional view of the oven taken on the line 3—3 of Fig. 2 showing a fire unit within the heating chamber of the cabinet and showing the baking compartment door in closed position;

Figure 4:
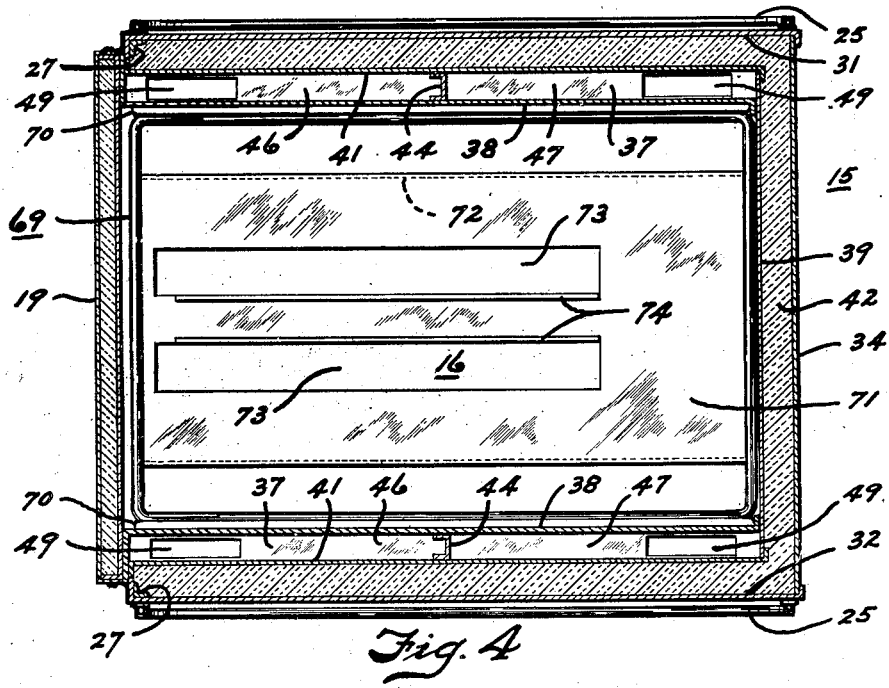
Fig. 4 is a horizontal transverse sectional view of the oven taken on the line 4—4 of Fig. 2 showing a baffle arrangement in the upper part of the baking compartment.
Figure 5:
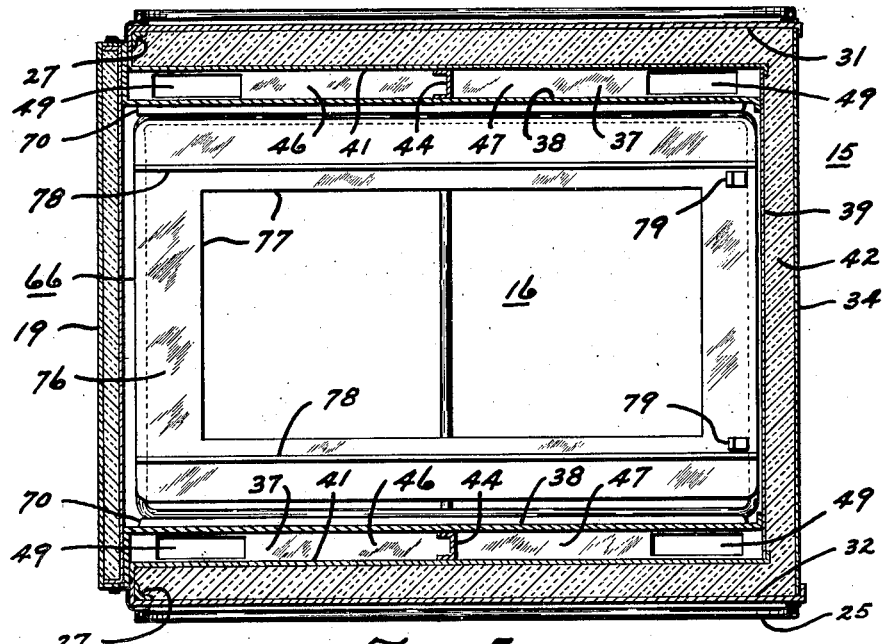
Fig. 5 is a horizontal transverse sectional view of the oven taken on the line 5—5 of Fig. 2 showing a baffle arrangement associated with the uppermost bread pan support in the baking compartment.
Figure 6:
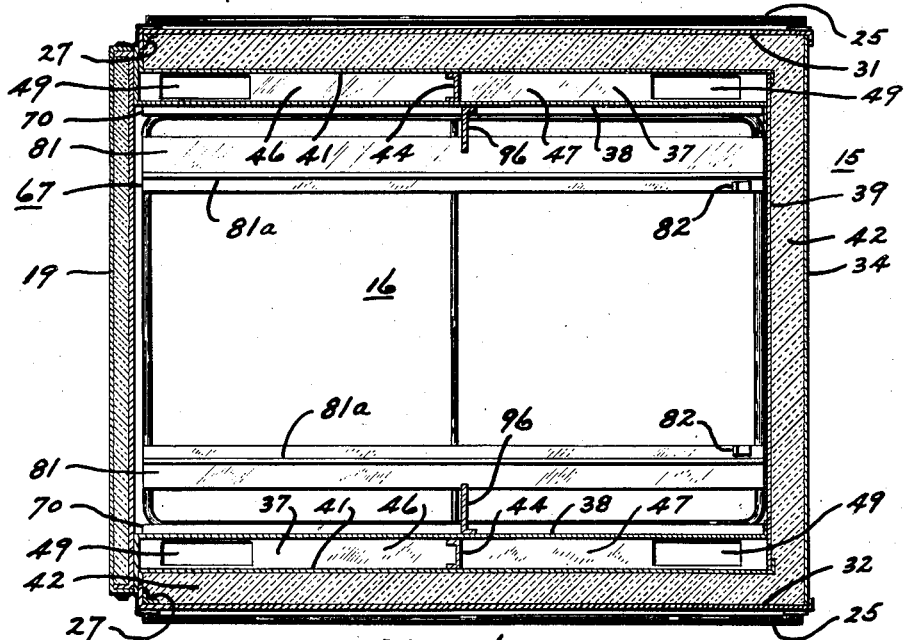
Figure 7:
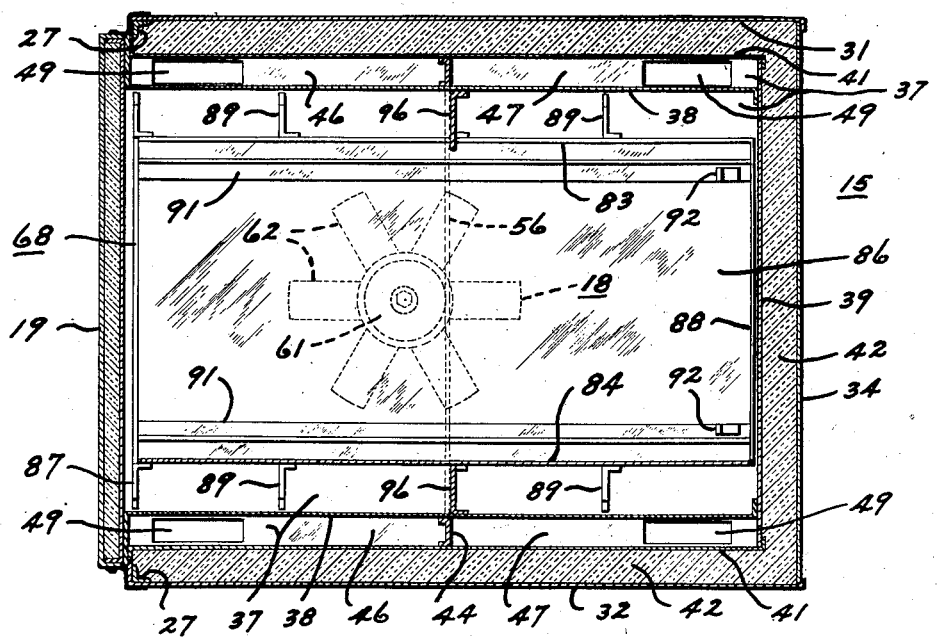

Fig. 6 is a horizontal transverse sectional view of the oven taken on the line 6—6 of Fig. 2 showing a baffle arrangement associated with an intermediate bread pan support in the baking compartment; and Fig. 7 is a view similar to Figs. 4, 5 and 6 taken on the line 7—7 of Fig. 2 showing the lower bread pan support and baffle unit associated therewith.

Referring to the drawings, for the purpose of illustrating the present invention, we have shown in Fig. 1 thereof a portable cabinet type baking oven generally represented by the reference numeral 15. The interior of this cabinet is divided into a baking compartment 16 and a heating chamber 17 (see Figs. 2 and 3) by a partition which forms the bottom wall of compartment 16. Chamber 17 is adapted to contain a gasoline or the like fire unit or heating apparatus generally represented by the reference character 18. The baking compartment 16 is normally closed by an insulated door structure 19 hinged to the cabinet at its lower edge so as to be vertically movable about its mounting hinges. The upper part of the front of the heating chamber is closed by a door 21 having an opening 22 centrally thereof providing access to the burner controls from the front of the cabinet or oven. Door 21 is spaced from the bottom of cabinet 15 so as to provide an opening 23 (see Figs. 1, 2 and 3) along the front of the heating chamber 17 whereby air may enter the chamber for proper mixing of the fuel employed in the fire unit or heating apparatus 18. The pivotally mounted handle 24 of the latching mechanism of door 19 forms a stop for supporting this door in a horizontal position, as shown in Fig. 2, when the door is fully opened. We also secure a long pivotally-mounted or foldable type handle 25 to each side of cabinet 15 and these handles 25 serve to facilitate moving of the cabinet from one locality to another.

Cabinet or oven 15 includes a unitary metal supporting frame which comprises a horizontal base portion 26 welded to a vertically disposed portion 27 extending entirely around the front of the cabinet and providing a door opening frame to which the hinges and latches of doors 19 and 21 are mounted. The supporting frame increases the structural strength of the cabinet which includes other sheet metal panels or shells built up around the frame to provide the compartment 16, chamber 17 and flues around the compartment. For example, the cabinet outer sheet metal side panels 31 and 32 and top panel 33 are welded or otherwise suitably secured to the portions 26 and 27 of the supporting frame. A back panel 34 (see Fig. 3) is welded to the back edge of top panel 33, side panels 31 and 32 and to the rear part of portion 26 of the supporting frame. A metal liner comprising horizontal walls 36 and 37, vertical side walls 38 and a back wall 39 is spaced from the cabinet outer walls 31, 32, 33 and 34 to form the baking compartment 16 and to provide a space between the cabinet outer walls. The space between the liner of compartment 16 and the cabinet outer side and top walls is divided into two spaces by an inverted "U" shaped metal member 41 which is welded at the front of the cabinet and to the back wall 39 of the liner. Insulating material such as glass wool or the like 42 is disposed between the liner back wall 39 and cabinet outer wall 34 and also between the inverted "U" shaped metal member 41 and the cabinet outer side walls 31 and 32 and the cabinet top wall 33. The space intermediate the inverted "U" shaped member 41 and the liner walls 36 and 38 forms a passage or flue extending substantially from the front to the back of cabinet 15 and around the top and side walls of compartment 16 for a purpose to be hereinafter more fully described. A channel-like metal member 44 (see Figs. 4 to 7) is located centrally with respect to the front and back of cabinet 15 within the passage just described and extends coextensively therewith to divide this passage or flue into two separate and distinct flues 46 and 47 of like section and equal size. The partition or bottom wall 37 of the baking compartment liner extends continuously from one side to the other side of cabinet 15 and is welded or otherwise suitably secured to the cabinet outer side panels 31 and 32 to substantially close the bottom of the flues 46 and 47. This wall 37, however, has small openings 49 provided near the corners of cabinet 15 (see Figs. 4 to 7) forming inlets to the flues 46 and 47 for the heat and gases generated in chamber 17 by the burner of the heating apparatus 18. Each flue 46 and 47 is provided with an outlet 51 in the cabinet top wall, the walls of which outlets are formed by a collar 52 secured to the metal walls 33 and 41 (see Fig. 3). A combined shield shutter or deflector device 53 may, if desired, be associated with the outlets 51. Within each collar 52 there is a second collar 54 secured to the liner wall 36, and which second collar provides vents communicating with the interior of oven or compartment 16 to permit the escape of moisture therefrom during a baking operation. In addition to the flue dividing member 44, we have provided a metal flame baffle 56 vertically disposed within the upper portion of chamber 17 (see Figs. 3 and 7) for directing more of the heat and flue gases upwardly through flue 46 than through flue 47. Flame baffle 56 extends transversely across chamber 17 and is so arranged with respect to the burners 62 as to direct a greater portion of the heat upwardly through flue 46 and this increased heat transmitted to the front portion of the baking compartment compensates for heat losses around the compartment opening closed by door 19 to thereby more uniformly heat the baking compartment along its depth. We also provide means whereby the flame of the burner of unit 18 will not burn against and overheat or deteriorate the side walls 31 and 32 of the heating chamber. This means is in the form of a vertically disposed metal baffle 58 (see Figs. 2 and 3) located along each side of cabinet 15 in spaced relation to the walls 31 and 32. These baffles 58 form a pocket-like space in the upper portion of chamber 17 and cause the heat created by fire unit 18 to be applied to the partition or bottom wall 37 of oven 16. The metal wall or partition 37 thus forms a radiating surface for indirectly heating the interior of oven 16 and the excess heat or gases flow toward the side walls of chamber 17 and are directed, by baffles 58, upwardly through the inlet openings 49 into flues 46 and 47. The flame and extremely hot gases are prevented by baffles 58 from contacting the cabinet side walls and thus deterioration of these walls is avoided in the vicinity of the heating chamber 17.

Heating apparatus of fire unit 18 located in the heating chamber 17 of cabinet or oven 15 may be a conventional gasoline unit usually comprising a gasoline tank, compressed air tank, adjustable mixing valves 59, for admitting the air and gas to a combustion chamber 61 or burner 62, pressure gauges 63, and all other essential controls for operation and adjustment of the unit. We also provide supporting tracks 64 welded or otherwise suitably secured to frame portion 26 of cabinet 15 (see Fig. 3) for mounting the fire unit 18 within the heating chamber 17 so that its control valves, etc., are accessible from exteriorly of cabinet 15 through the opening 22 in door 21. As before stated, a fire unit of the type shown is conventional and its structure need not be herein specifically described since one skilled in the gasoline burner or fire unit art will obviously understand its construction and operation.

Referring again to the drawings and particularly to Fig. 2 thereof, it will be seen that we have provided three shelves or pan supports generally represented by the reference characters 66, 67 and 68 disposed one above the other in the baking compartment 16 of oven 15. Each support or shelf is adapted to receive and support a standard United States Army baking pan of a size approximating 3" x 12" x 24". Each of the three pans in oven 16 has a capacity of ten pounds when baking garrison loaf bread therein or eight pounds when baking field loaf bread. A fourth shelf-like member generally represented by the reference numeral 69, located in the top portion of compartmnt 16, serves as baffle means for retarding the flow of heated air out of the compartment 16 and for concentrating heat above the bread located in the bread pan, adapted to be located on the upper support or shelf 66 therebelow. The supports or shelves 66, 67 and 69 are slidably mounted within metal tracks 70 welded or otherwise suitably secured to the side walls 38 of compartment 16. Member 69 comprises a heavy wire-like bounding frame having a metal plate 71 welded thereto. This plate 71 is provided with down-turned sides 72 (see Figs. 2 and 3) forming vertical baffles within the plane of the side walls of the baking pan therebelow. Plate 71 is also provided with two punch-out portions or openings 73 (see Fig. 4) provided on one side thereof with upturned lips 74. The downturned sides 72 of plate or baffle 71 causes some of the heated air upon rising to the hot top portion of oven 16 to be directed toward the oven top wall 36 above the baffle means 69. Openings 73 in plate 71 of the baffle means 69 permits the deflection of sufficient heat to the central part of oven 16 immediately above the bread pan adapted to be located on the support 66 to cause proper baking and the desired uniform browning of bread within this pan. The shelf 66 includes a heavy wire-like bounding frame, having a metal plate 76, provided with an opening 77 therein (see Fig. 5), welded or otherwise suitably secured to the bounding frame. This plate 76 is spaced from one side of the bounding frame to provide a passage from beneath to above the shelf 66. A portion of plate 76 adjacent its edges is bent upwardly as at 78 to provide a track portion intermediate the bent-up flanges 78 for receiving and supporting a bread pan centrally within the compartment 16. A small angle-iron piece 79, inwardly of the flanges 78 and at the back of shelf 66, forms a stop for the bread pan when the pan is slid along its track supporting portion. The shelf 67 includes a heavy wire-like bounding frame having two spaced apart metal plates 81 welded thereto (see Fig. 6). The plates 81 are each provided with a bent-up portion 81a to form a track-like portion for receiving therebetween a baking pan and small angle-iron pieces 82 at the rear of the shelf 67 to form a stop for the pan adapted to be supported on shelf 67. It is to be noted that a greater space is provided between the outer edge of plates 81 and the side walls 38 of compartment 16 than is provided between these walls and the plate 76 of shelf 66 (see Figs. 5 and 6). This difference in spacing the outer edges of the plates 81 and plate 76 from the side walls 38 of compartment 16 provides a restricted or graduated upward flow of heated air within the baking compartment. Since a great portion of heat is transmitted through the partition 37, forming the bottom wall of oven 16, the lower pan support and the bread pan supported thereon is shielded by the integral baffle arrangement or removable baffle unit 68 and this unit directs the heat upwardly and toward the oven side walls 38. Thus, the lower structure or unit 68 in oven 16 comprises a series of baffles including a "V" shaped metal member 83 (see Figs. 2 and 3) extending the full depth of compartment 16 and having one leg 84 of the "V" extending upwardly above the baking pan (see Figs. 2 and 7). A flat piece of sheet metal 86 is disposed between the legs of the "V" shaped member 83 and has its edges welded thereto to form a false bottom below the lowermost baking pan. A vertical front baffle 87, a vertical rear baffle 88, and intermediate vertical baffles 89 (see Figs. 3 and 7) welded to the metal pieces or baffles 83 and 86 close the space between pieces 83 and 86 and also support this integral removable baffle unit or structure 68 from the oven bottom wall 37. Metal strap members 91 bent to form the baking pan support portion of unit 68 are welded to the integral baffle structure 68, comprising pieces 83, 86, 87, 88 and 89, and are provided with pan stops 92 at the rear thereof. The baffle unit 68 shields the baking pan from intense heat rising from the oven or compartment bottom wall 37. In addition to the horizontally disposed baffles of the supports 66 and 67 and the vertical baffles 87, 88 and 89 of unit 68, we provide the oven or compartment 16 with vertically aligned and vertically disposed baffles 96 located centrally of the depth of compartment 16 and secured to the compartment side walls 38. These oven vertical baffles 96 form means to prevent a sweeping action of the heated air in a direction from the front of the rear of the baking compartment 16.

During a baking operation with the device disclosed, the flame or flames from the burner or burners 62 of the fire unit or heating apparatus 18 are directed upwardly against the partitioning means or bottom wall 37 of oven 16. The major portion of heat indirectly put into oven 16 is transmitted through its bottom heat radiating wall, and because of this condition, it is necessary to shield the bottom bread pan in the oven. The integral baffle unit 68 resting on the bottom wall 37 of oven 16 serves as this shielding means and also directs the heated air in separate paths, intermediate the baffles 89, over to the oven side walls 38. The use of the baffle unit 68 is important in a vertically elongated baking compartment of considerable depth because it breaks up a convection within the oven which normally causes air, upon being heated, to move in a direction within the oven that is detrimental to uniform baking of bread therein. Therefore, the V and other portions of baffle unit 68 play an important part in cooperation with other baffles in the oven 16 in setting up the desired circulation therein to insure uniform heating at all points within the oven. The one leg 84 of the metal piece 83, forming the V in the baffle unit 68, extends upwardly a considerable distance above the lower baking pan support to initiate a movement of air within the oven. The heated air rises along the oven side walls 38 and flows under and around the plurality of baking pans by way of the space between the outer edge of baffle plates 81 and 76, on shelves 67 and 66 respectively, and the side walls 38 of oven 16. This heated air rises to the top of oven 16 and flows around the edges 72 of baffle plate 71 and through the openings 73 in plate 71 to the oven vents formed by collars 54. The baffle plates 71, 76 and 81 also serve to direct heat across the top of loaves of bread in the baking pans and this tends to provide a desired and balanced temperature condition in the center of the oven in the vicinity of each shelf. When bread is being baked in the oven or compartment 16, moisture driven out of the bread escapes from the oven by way of the vents formed by collars 54. In addition to the heating of the interior of oven 16 through the partition or bottom wall 37 thereof, it is to be understood that further heating of the oven interior is accomplished in the structure disclosed through the oven top and side walls, adjacent to which walls the flues 46 and 47 are located. The heat and fuel gases from the flame or flames of burner 62, after striking the bottom wall 37 of oven 16, flow horizontally toward the side walls 31 and 32 of cabinet 15 and strike the side baffles 58 in the heating chamber 17. These baffles 58, while protecting the cabinet outer side walls, cause the heat and fuel gases to flow upwardly through the inlet openings 49 provided in bottom wall 37 of oven 16, into the vertical part of flues 46 and 47. This heat and fuel gas flows upwardly in two separated paths in the flues 46 and 47, by virtue of the flue dividing member 44, and thence horizontally therein across the top wall 36 of compartment 16 to the outlets or chimneys 51 whereupon they escape from cabinet 15.

From the foregoing, it will be seen that we have provided a rugged, lightweight oven construction having an improved baffle system or arrangement incorporated therein to obtain the desired or improved circulation necessary to properly and uniformly bake bread in pans disposed one above the other in a vertically elongated compartment. The improved baffle system or arrangement prevents a wide temperature differential between the front and back of the oven as well as between the top and bottom thereof to thereby obtain uniform baking at various localities within the oven. By heating the bottom wall of the oven and by circulating fuel gases and heat around other walls of the oven, a vertically elongated baking compartment can be indirectly heated to a more uniform temperature throughout its interior. The fact, that most of the baffles form a part of a removable shelf or removable baffle unit, renders the oven easily cleanable when these shelves or unit are removed. By constructing the improved structure disclosed substantially entirely of sheet metal, a thirty-pound bread baking capacity oven of minimum cubic content and weighing not more than three hundred fifty pounds, complete with the fire unit therein, is provided at low manufacturing cost. In the improved oven construction disclosed, we have, by indirectly heating the interior thereof, isolated the substance to be baked in the oven from the air and gases emanating from the oven heating means to thus prevent the flue or flame gases of the gasoline fire unit from coming into contact with such substance whereby the substance will not absorb lead or other ingredients of the gases.

While the form of embodiment of the invention as herein disclosed constitutes a preferred form, it is to be understood that other forms might be adopted, all coming within the scope of the claims which follow.

What is claimed is as follows:

1. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides and the top of the compartment, said partition extending beyond said compartment and forming a closure for the major portion of the bottoms of said flue and being provided with a plurality of openings each disposed adjacent a corner of the oven, the openings in said partition providing inlets to said flue for the flow of heated air and gases thereinto from said heating chamber, means in the top wall of said oven forming an outlet for the flue, means within said outlet and extending through said flue providing a vent for said baking compartment, and vertically disposed baffle means extending transversely across at least the upper portion of said chamber intermediate the front and back thereof and being off-set with respect to the center of the heating area of said heating means in a direction toward the back of said chamber to cause a greater amount of the air and gases heated by said heating means to flow toward said flue inlets disposed at the front corners of said oven.

2. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides and the top of the compartment, said partition extending beyond said compartment and forming a closure for the major portion of the bottoms of said flue and being provided with a plurality of openings each disposed adjacent a corner of the oven, the openings in said partition providing inlets to said flue for the flow of heated air and gases thereinto from said heating chamber, means in the top wall of said oven forming an outlet for the flue, means within said outlet and extending through said flue providing a vent for said baking compartment, and vertically disposed baffle means within the upper portion of said heating chamber and spaced from the side walls thereof for directing the heated air and gases from said chamber toward said flue inlets.

3. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides and the top of the compartment, said partition extending beyond said compartment and forming a closure for the major portion of the bottoms of said flue and being provided with a plurality of openings each disposed adjacent a corner of the oven, the openings in said partition providing inlets to said flue for the flow of heated air and gases thereinto from said heating chamber, means in the top wall of said oven forming an outlet for the flue, means within said outlet and extending through said flue providing a vent for said baking compartment, vertically disposed baffle means within the upper portion of said heating chamber and spaced from the side walls thereof for directing the heated air and gases from said chamber toward said flue inlets, and an additional vertically disposed baffle extending transversely across at least the upper portion of said chamber intermediate the front and back thereof and being off-set with respect to the center of the heating area of said heating means in a direction toward the back of said chamber to cause a greater amount of the air and gases heated by said heating means to flow toward said flue inlets disposed at the front corners of said oven.

4. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides and the top of the compartment, said flue extending throughout the depth of said compartment and having means therein coextensive with the length thereof dividing same into a first smaller flue and a second smaller flue, said partition extending beyond said compartment and forming a closure for the major portion of the bottoms of said flues and being provided with a plurality of openings each disposed adjacent a corner of the oven, the openings in said partition providing inlets to said flues for the flow of heated air and gases thereinto from said heating chamber, means in the top wall of said oven forming separate outlets for said first and said second smaller flues, said first and said second smaller flues providing separate paths of flow for the heated air and gases entirely from their respective inlets to their respective outlets in said oven top wall, means within at least one of said outlets and extending therethrough to provide a vent for said baking compartment, and a vertically disposed baffle extending transversely across at least the upper portion of said chamber intermediate the front and back thereof and being off-set with respect to the center of the heating area of said heating means in a direction toward the back of said chamber to cause a greater amount of the air and gases heated by said heating means to flow toward the inlets of said first smaller flue than the inlets of said second smaller flue.

5. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides and the top of the compartment, said flue extending throughout the depth of said compartment and having means therein coextensive with the length thereof dividing same into a first smaller flue and a second smaller flue, said partition extending beyond said compartment and being provided with a plurality of openings each disposed adjacent a corner of the oven, the openings in said partition providing inlets to said flues for the flow of heated air and gases thereinto from said heating chamber, means in the top wall of said oven forming separate outlets for said first and said second smaller flues, and said first and said second smaller flues providing separate paths of flow for the heated air and gases entirely from their respective inlets to their respective outlets in said oven top wall.

6. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides and the top of the compartment, said flue extending throughout the depth of said compartment and having means therein coextensive with the length thereof dividing same into a first smaller flue and a second smaller flue, said partition extending beyond said compartment and being provided with a plurality of openings each disposed adjacent a corner of the oven, the openings in said partition providing inlets to said flues for the flow of heated air and gases thereinto from said heating chamber, means in the top wall of said oven forming separate outlets for said first and said second smaller flues, said first and said second smaller flues providing separate paths of flow for the heated air and gases entirely from their respective inlets to their respective outlets in said oven top wall, and a vertically disposed baffle extending transversely across at least the upper portion of said chamber intermediate the front and back thereof and being off-set with respect to the center of the heating area of said heating means in a direction toward the back of said chamber to cause a greater amount of the air and gases heated by said heating means to flow toward the inlets of said first smaller flue than the inlets of said second smaller flue.

7. In a portable oven, the combination of a partition within and extending entirely across the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, a plurality of supports arranged in spaced relation one above the other within said compartment for receiving pans adapted to contain a substance to be baked, one of said supports being in the form of an integral unit comprising a plurality of spaced apart vertically disposed baffles resting on said compartment bottom wall and a horizontally disposed substantially V-shaped shielding means spaced from said wall by said vertically disposed baffles, said shielding means directing heated air within the compartment toward and upwardly along the side walls thereof, and additional baffle means disposed above another of said plurality of supports for directing at least some of the upwardly flowing heated air in said compartment toward the center thereof and over the top of a pan adapted to be located on said another support.

8. In a portable oven, the combination of a partition within and extending entirely across the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, a support in the lower portion of said compartment, a support in the upper portion of said compartment, said supports being adapted to receive pans for containing a substance to be baked, the lowermost support being in the form of an integral unit comprising a plurality of spaced apart vertically disposed baffles resting on said compartment bottom wall and a horizontally disposed substantially V-shaped shielding means spaced from said wall by said vertically disposed baffles, said shielding means directing heated air within the compartment toward and upwardly along the side walls thereof, and means in the upper portion of said compartment for concentrating the heated air therein at a point directly above a pan adapted to be located on the uppermost of said supports.

9. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides of the compartment, said partition extending beyond said compartment and forming a closure for the major portion of the bottoms of said flue and being provided with a plurality of openings each disposed adjacent a corner of the oven, the openings in said partition providing inlets to said flue for the flow of heated air and gases thereinto from said heating chamber, means forming an outlet for the flue, means providing a vent for said baking compartment, and vertically disposed baffle means extending transversely across at least the upper portion of said chamber intermediate the front and back thereof and being off-set with respect to the center of the heating area of said heating means in a direction toward the back of said chamber to cause a greater amount of the air and gases heated by said heating means to flow toward said flue inlets disposed at the front corners of said oven than toward the inlets disposed at the back corners of said oven.

10. In a portable oven of rectangular shape in horizontal cross section, the combination of a partition within the oven dividing the interior thereof into an upper baking compartment and a lower heating chamber, means for directly heating air within said chamber, said partition preventing communication of air between said compartment and said chamber and constituting a heat radiating bottom wall of said compartment for indirectly heating the interior thereof, means spaced from walls of said compartment and forming a flue along two sides of the compartment, said partition extending beyond said compartment and forming a closure for the major portion of the bottoms of said flue and being provided with a plurality of openings each disposed adjacent a corner of the oven, the openings in said partition providing inlets to said flue for the flow of heated air and gases thereinto from said heating chamber, means forming an outlet for the flue, means providing a vent for said baking compartment, and baffle means within the upper portion of said heating chamber and spaced from the side walls thereof to protect said side walls from the heated air and gases from said heating means and for directing the heated air and gases within said chamber toward said flue inlets.

EDMUND F. SCHWELLER.
CLIFFORD H. WURTZ.